3,551,390
COPOLYMERS OF PARA-ISOPROPENYLPHENYL ISOCYANATE
Heinrich Krimm, Krefeld-Bockum, Georg Malamet, Krefeld, and Hermann Schnell, Krefeld-Urdingen, Germany, assignors to Farbenfabriken Bayer Aktiengesellschaft, Leverkusen, Germany, a corporation of Germany
No Drawing. Filed Oct. 19, 1967, Ser. No. 676,618
Claims priority, application Germany, Oct. 20, 1966, F 50,491
Int. Cl. C08f 19/00, 27/10
U.S. Cl. 260—78.5                          10 Claims

ABSTRACT OF THE DISCLOSURE

Copolymers prepared by reacting vinyl compounds or maleic or fumaric acid derivatives with the reaction product of p-isopropenylphenyl isocyanate and a masking agent in the presence of a catalyst.

---

This invention relates to copolymers of masked unsaturated isocyanates and more particularly to copolymers of vinyl compounds or derivatives of maleic or fumaric acid and masked p-isopropenylphenyl isocyanate.

Although copolymers prepared from unsaturated isocyanates and vinyl compounds have been prepared heretofore, such copolymers are relatively unstable due to the presence of free isocyanato groups in their structures. These types of polymers which are initially soluble materials are converted within a short time into an insoluble and infusible state, thus becoming commercially useless, even in those cases where moisture has been carefully excluded.

In addition, because p-isopropenylphenyl isocyanate is not very highly reactive in the radical-initiated polymerization reaction, it has not been considered as a feasible reactant for the production of copolymers with vinyl compounds. This is particularly true since p-isopropenylphenyl isocyanate differs little from the unsubstituted parent compound a-methylstyrene. As a consequence, in reactions involving this unsaturated isocyanate, unsatisfactory yields and low degrees of polymerization are obtained after the usual polymerization conditions have been satisfied in much the same way as in those cases wherein a-methylstyrene is used as a reactant.

It is therefore an object of this invention to provide a unique copolymer and a process for its preparation which is devoid of the foregoing disadvantages.

A further object of this invention is to provide a process for preparing stable copolymers of unsaturated isocyanates which do not become insoluble and infusible after they are prepared.

Another object of this invention is to provide a process for preparing copolymers from p-isopropenylphenyl isocyanate and vinyl compounds as well as other unsaturated co-reactants.

Still another object of this invention is to provide a unique copolymeric material having repeating units derived from p-isopropenylphenyl isocyanate and other unsaturated compounds.

Yet another object of this invention is to provide a unique copolymeric material suitable for use as binders, coatings, lacquers, laminates, adhesives and the like.

The foregoing objects and others which will become apparent from the following description are accomplished in accordance with this invention, generally speaking, by providing a unique polymer and a process for the preparation thereof which involves reacting vinyl compounds or derivatives of maleic or fumaric acid with derivatives of unsaturated isocyanates in the presence of radical-forming agents or catalysts, in which process the derivatives of the unsaturated isocyanate used are the reaction products of p-isopropenylphenyl isocyanate and masking agents.

The instant process offers the great advantage that practically quantitative yields are achieved under the usual polymerization conditions and within the usual polymerization times. Nevertheless, the polymerization activity of the derivatives of p-isopropenylphenyl isocyanate in accordance with this invention is still extraordinarily high, being of about the same order as that of methacrylic acid derivatives. Further, the copolymeric reaction products obtained are all stable during storage and show no tendency to undergo cross-linking at room temperatures. Hence, the reaction product as well as the reaction itself differs markedly from those in which monomeric a-methylstyrene or free p-isopropenylphenyl isocyanate is used, particularly since practically quantitative yields are obtained.

Further, the copolymers of this invention offer the special advantage that the masking agents employed to protect the isocyanate groups during polymerization and storage can be removed or replaced at relatively low temperatures. For example, the temperatures required to liberate the isocyanate groups by displacing the masking agents from the copolymers of this invention are generally in the range of from about 100° to about 180° C. and preferably from about 120° to about 150° C. Thus, secondary reactions such as cross-linking reactions are made possible by the liberation of the isocyanate groups from the copolymer or by displacement of the masking agents. This differs markedly from prior art masked isocyanates wherein the free isocyanate groups are regenerated by removing the masking agents at more elevated temperatures, in many cases using a temperature range above 180° C. At such elevated temperatures, the masked isocyanates then react like free isocyanates by displacing the masking agents with other reactive groups such as alcoholic hydroxyl groups, amino groups and the like.

The p-isopropenylphenyl isocyanate used in accordance with this invention may be obtained in any suitable manner such as, for example, according to the process described in U.S. Pat 2,640,068. The process described involves the phosgenation of p-isopropenyl aniline with the evolution of hydrogen chloride from the corresponding isopropenylphenyl carbamic acid chloride.

Any suitable masking agents for an isocyanate may be used in order to prepare the derivatives of the unsaturated isocyanate in accordance with this invention.

Thus, p-isopropenylphenyl isocyanate may be reacted with a secondary aromatic amine as disclosed in U.S. Pat. 2,683,727, a tertiary alcohol as disclosed in U.S. Pat. 2,683,728, an enolizable-hydrogen containing compound as disclosed in U.S. Pat. 2,683,729; a lactam as disclosed in U.S. Pat. 2,698,845; an imide as disclosed in U.S. Pat. 2,725,385; a monohydric phenol as discussed in U.S. Pat. 2,733,261; isocyanatebisulphite adduct formaldehyde reaction products as disclosed in U.S. Pat 2,746,988; a mercaptan as disclosed in U.S. Pat. 2,764,592; an hydroxyalkyl carbamic acid arylester as disclosed in U.S. Pat. 2,797,232; any of the polyaclohols disclosed in U.S. Pat. 2,855,421 that are subsequently reacted with a phenol and any of the blocking agents disclosed in U.S. Pats. 2,952,665; 3,080,368 and the like as masking agents for the unsaturated isocyanate in accordance with this invention. Some specific masking agents which may be used are, for example, phenols, such as phenol, o-, m-, or p-cresol, p-tertiary butylphenol and the like; acid amides such as pyrrolidone-(2), caprolactam, oxazolidone-(2), phthalimide and the like; heterocyclic bases such as for example imidazole, pyrrole and the like, compounds with reactive methylene groups such as ketones, for example cyclohexanone, acetylacetone, and the like and esters e.g. ethylacetic acetate, malonic acid ethyl ester, any other suitable ester of malonic acid and the like; oximes such as, for eaxmple, acetoxime, cyclohexanone oxime, and the like as well as bisulfites.

The copolymers of this invention may be prepared by reacting the derivatives of p-isopropenylphenyl isocyanate with any suitable vinyl monomer such as for example a-methylstyrene, vinyl chloride, vinylidene chloride, vinyl acetate, diisopropenyl benzene, diallylcarbonate, diisopropenylphenylcarbonate, triallyl phosphate, triallyl cyanurate, styrene, acrylic acid, methacrylic acid, esters, amides and nitriles of acrylic acid and methacrylic acid such as, for example, methyl acrylate, ethyl acrylate, butyl acrylate, methyl methacrylate, ethyl methacrylate, butyl methacrylate, acrylamide, N-methyl acrylamide, N-phenyl acrylamide, methacrylamide, N-ethyl-methacrylamide, N-cyclohexyl methacrylamide, acrylnitrile, methacrylnitril, butadiene, divinylbenzene, maleic acid anhydride, polyesters prepared by reacting maleic or fumaric acid with polyols such as ethylene glycol, 1,4-butane diol, 1,6-hexane-diol, 1,9-nonane diol, glycerol, trimethylolpropane, hydrochinone, diethylene glycol, triethyleneglycol and the like.

The copolymerization reaction may be carried out as a solution polymerization, by polymerization in bulk or by dispersion polymerization. In any case, the reaction is carried out in the presence of a catalyst which promotes the polymerization of the reactants across the double bonds. Some such suitable catalysts or radical-forming agents are, for example, peroxides including t-butylhydroperoxide, di-t-butyl peroxide, cumene, hydroperoxide, dicumene peroxide, methylisobutylketone peroxide, cyclohexanone peroxide, dibenzoyl peroxide, t-butylperbenzoate, acetylcyclohexylsulphonyl peroxide and the like. Cold hardening Redox systems, such as cyclohexanone peroxide/cobalt naphthenate, potassium persulfate/sodium bisulphite and the like may also be used as catalysts or radical-forming agents in the process of this invention. Preferably, however, the catalysts or radical-forming agents employed are azodiacylnitriles such as azodiisobutyric acid nitrile and the like.

In those embodiments of this invention wherein a solvent polymerization is being carried out, any suitable solvent may be employed, such as, for example, benzene, toluene, xylene, butanol, dimethylformamide, dioxane, ethyl acetate, butyl acetate, and the like.

The polymerization temperature employed generally depends on the decomposition temperature of the radical forming agents. These temperatures are generally in the region of from about 0° to about 120° C., and preferably from about 60° to about 100° C. If easily volatile vinyl monomers are used, polymerization may also be performed in a pressure vessel.

The new copolymers of this invention may be used for the production of binders, coatings, lacquers, laminates, adhesives and the like such as, for example, in paints for floors and walls and the like.

The invention is further illustrated but is not intended to be limited by the following examples in which all parts and percentages are by weight unless otherwise specified.

EXAMPLE 1

Colorless crystals of p-isopropenylphenyl-carbamic acid phenyl ester having a melting point of about 150° C. are prepared by heating equimolar quantities of p-isopropenylphenyl isocyanate and phenol in toluene with the addition of a few drops of triethylamine for about 5 hours and recrystallizing the product from methylene chloride. A solution of about 100 parts of the p-isopropenylphenyl-carbamic acid phenyl ester in about 20 parts of acrylonitrile is heated with the addition of about 2 parts of azodiisobutyronitrile for about 6 hours at about 60° C. in an atmosphere of nitrogen. A yellow-brown, milky-cloudy hard polymer is obtained which is practically free from monomers.

When the polymer is dissolved in dimethylformamide and heated to about 130° C. with a stoichiometric quantity of 1,1,1-trimethylolpropane and a few drops of triethylamine, gel formation sets in after about 10 minutes.

COMPARISON TESTS

If a solution of about 100 parts of p-isopropenylphenyl isocyanate is heated in about 20 parts of freshly distilled acrylonitrile with the addition of about 2 parts of azodiisobutyric acid nitrile under nitrogen for about 11 hours at about 60° C., although gelling takes place, a brown gel is formed which contains a considerable proportion of unreacted monomers.

EXAMPLE 2

Colorless crystals of an adduct of p-isopropenylphenyl isocyanate and caprolactam having a melting point of about 101° C. are prepared by reacting about equimolar quantities of p-isopropenylphenyl isocyanate and caprolactam in toluene for about 10 hours with the addition of a few drops of triethylamine and recrystallizing the product from ethyl acetate. A solution of about 100 parts of the adduct in about 200 parts of methylmethacrylate is heated for about 25 hours at about 70° C. with the addition of about 2 parts of methyl isobutylketone peroxide in an atmosphere of nitrogen. A slightly cloudy green-tinged, high molecular weight, hard polymer is obtained from which a colorless powder having a softening point of about 220° C. is obtained in 90% yield after solution in chloroform and precipitation with methanol.

When a sample is heated to about 130° C. in 1,1,1-trimethylol propane or hexamethylenediamine, cross-linking sets in after about 20 minutes.

COMPARISON TEST

If a solution af about 100 parts of p-isopropenylphenyl isocyanate in about 200 parts of dry methyl methacrylate is heated under nitrogen for about 25 hours at about 70° C. with the addition of about 2 parts of methyl isobutylketone peroxide, only about 30 parts of a residue insoluble in the usual solvents remain behind after removal of the unreacted monomers by distillation at about 20 mm. Hg.

EXAMPLE 3

Yellowish crystals of an adduct of p-isopropenylphenyl isocyanate and ethyl acetate having a melting point of about 77° C. are prepared by reacting equimolar quantities of the components in the presence of a few drops of triethylamine. The reaction mixture reaches a temperature of about 80° C. spontaneously. The product is recrystallized from cyclohexane. A solution of about 100 parts of the adduct in about 200 parts of styrene is heated in an atmosphere of nitrogen for about 20 hours at about 60° C. with the addition of about 2 parts of azodiisobutyric acid nitrile. After the clear, yellowish, soft, elastic polymer is dissolved in methylene chloride and precipitated with methanol, a yellow powder having a softening point of about 150° C. is obtained in about 85% yield.

COMPARISON TEST

If a solution of about 100 parts of p-isopropenylphenyl isocyanate in about 200 parts of anhydrous styrene, to which about 2 parts of azodiisobutyric acid nitrile has been added, is heated at about 60° C. for about 70 hours while dry nitrogen is passed through, a soft reaction product is obtained from which about 85 parts of unreacted starting material can be distilled off under a vacuum of about 20 mm. Hg. The yellowish polymer which remains behind in 72% yield and which initially is soluble in solvents such as benzene or toluene becomes cross-linked and, after about 5 days, will only swell in such solvents.

EXAMPLE 4

A solution of about 9 parts of p-isopropenylphenyl-carbamic acid phenyl ester, about 28 parts of ethyl acrylate, about 11 parts of styrene, about 5 parts of 2-hydroxypropylmethacrylate, about 0.5 part of azodiisobutyric acid nitrile and about 0.5 part of diisopropylxanthic disulphide added to control the reaction and about 50 parts of xylene is heated at about 80° C. for about 12 hours under nitrogen. After about 8.5 hours, about 91% of polymer has formed and, after about 12 hours, practically about 100%. A clear, yellowish, viscous solution is obtained from which films can be cast which can be stoved for about 30 minutes at about 150° C. The stoving temperature required can be reduced to about 130° C. by the presence of a trace of tertiary amine. Colorless, firmly adhering, highly elastic, high-gloss coatings are obtained.

COMPARISON TEST

If a solution of about 9 parts of p-isopropenylphenyl isocyanate, about 28 parts of dry ethyl acrylate, about 12 parts of dry styrene, about 0.5 part of azodiisobutyric acid nitrile and about 50 parts of dry xylene are heated in the same way at about 80° C., the extent of conversion is about 44% after about 12 hours, about 57% after about 16 hours and only about 86% after about 33 hours.

EXAMPLE 5

About 10 parts of the caprolactam adduct obtained in Example 2 are added to the composition obtained in Example 4 instead of the p-isopropenylphenyl isocyanate masked with phenol. About 100% conversion is achieved after about 20 hours. A pale yellow, highly viscous solution is obtained from which lacquer films of the same quality as those obtained in Example 4 are obtained.

EXAMPLE 6

Using otherwise the same composition as in Example 5, about 9 parts of colorless crystals of an adduct of pyrrolidone-(2) and p-isopropenylphenyl isocyanate having a melting point of about 159° C. and prepared in the same way as the caprolactam adduct are used instead of the caprolactam adduct. The conversion is about 97% after about 17.5 hours.

EXAMPLE 7

A solution of about 25 parts of xylene, about 25 parts of butanol, about 28 parts of ethyl acrylate, about 12 parts of styrene, about 5 parts of 2-hydroxypropyl methacrylate, about 0.5 part of azodiisobutyric acid nitrile, about 0.05 part of acetyl cyclohexylsulphonyl peroxide, about 0.2 part of dodecylmercaptan and about 9 parts of the adduct of oxazolidone-(2) and p-isopropenylphenyl isocyanate (colorless crystals having a melting point of from about 153° to about 155° C. and prepared by heating equimolar quantities of the components in dioxane at about 50° C. for about 15 hours and recrystallizing the product from ethyl acetate) is kept at about 60° C. for about 20 hours in an atmosphere of nitrogen. A clear, yellowish, viscous solution is obtained. The reaction is practically quantitative. Colorless, clear, elastic, firmly adhering lacquer coatings can be produced from the solution by stoving at about 150° C. for about 30 minutes.

EXAMPLE 8

A mixture of about 28 parts of ethyl acrylate, about 12 parts of styrene, about 5 parts of 2-hydroxypropylmethacrylate, about 9 parts of p-isopropenylphenyl carbamic acid phenyl ester and about 10 parts of dimethylformaamide are added with vigorous stirring to a solution of about 0.5 part of sodium lauryl sulphonate as emulsifier and about 0.1 part of potassium persulphate in about 100 ml. of water. After the addition of about 0.04 part of sodium pyrosulphite, the reaction mixture is kept in an atmosphere of nitrogen for about 2 hours at a bath temperature of about 60° C. (exothermic reaction). A low viscosity emulsion is obtained which, at practically 100% conversion, has a solids content of 32%.

Glossy, hard and extremely firmly adhering lacquer coatings can be produced from the emulsion by heating at about 150° C. for about 30 minutes.

EXAMPLE 9

About 6 parts of p-isopropenylphenyl-carbamic acid phenyl ester and about 0.6 part of di-t-butyl peroxide are dissolved in a solution of about 37 parts of an unsaturated polyester having an hydroxyl number of about 38 and prepared from maleic acid anhydride, ethylene glycol, butanediol-(1, 3) and 4,4'-dihydroxydicyclohexyl-2,2-propane in 19 parts of styrene. Films having a thickness of about 1 mm. are poured from this solution and heated in a closed vessel for about 10 hours at about 90° C. until they have gelled and the surface is not sticky at room temperature. The films are then heated in an open vessel for about 2 hours at about 150° C., to produce firmly adhering, high gloss, hard, highly elastic coatings which are completely resistant to toluene.

It is to be understood that any of the components and conditions mentioned as suitable herein can be substituted for its counterpart in the foregoing examples and that although the invention has been described in considerable detail in the foregoing, such detail is solely for the purpose of illustration. Variations can be made in the invention by those skilled in the art without departing from the spirit and scope of the invention except as is set forth in the claims.

What is claimed is:

1. A process for the preparation of stable copolymers from an unsaturated isocyanate which comprises copolymerizing a derivative of p-isopropenylphenyl isocyanate with a vinyl compound, a maleic acid derivative or a fumaric acid derivative in the presence of a radical forming agent, wherein the derivative of p-isopropenylphenyl isocyanate is prepared by reacting p-isopropenylphenyl isocyanate with a masking agent.

2. The process of claim 1 wherein the copolymerization is carried out as a solution polymerization, a polymerization in bulk or by dispersion polymerization.

3. The process of claim 1 wherein the polymerization temperature is from about 0° C. to about 120° C.

4. The process of claim 1 wherein the derivatives of maleic acid or fumaric acid are polyesters thereof.

5. The process of claim 1 wherein the radical forming agent is a peroxide, a cold hardening Redox system or an azodiacylnitrile.

6. The process of claim 1 wherein the masking agent is a phenol, an acid amide, a heterocyclic base, a compound with reactive methylene groups, an oxime or a bisulfite.

7. The process of claim 1 wherein the masking agent is displaced from the copolymer at a temperature of from about 100° C. to about 180° C., and a secondary crosslinking reaction is carried out.

8. The product of the process of claim 1.

9. The product of the process of claim 4.

10. The product of the process of claim 7.

References Cited

UNITED STATES PATENTS

| | | | |
|---|---|---|---|
| 2,503,209 | 4/1950 | Nyquist et al. | 260—45.4 |
| 2,606,892 | 8/1952 | Kropa et al. | 260—80.3 |
| 2,882,260 | 4/1959 | Bartl et al. | 260—77.5 |
| 3,299,007 | 1/1967 | Suling et al. | 260—77.5 |

JOSEPH L. SCHOFER, Primary Examiner

J. KIGHT, Assistant Examiner

U.S. Cl. X.R.

260—75, 77.5, 78, 82.1, 85.5, 85.7, 86.1, 87.5, 87.7, 88.1, 870; 117—161